Feb. 23, 1926.
F. K. FISH, JR
1,574,026
PROCESS FOR MAKING PAPER PULP
Original Filed Nov. 5, 1920
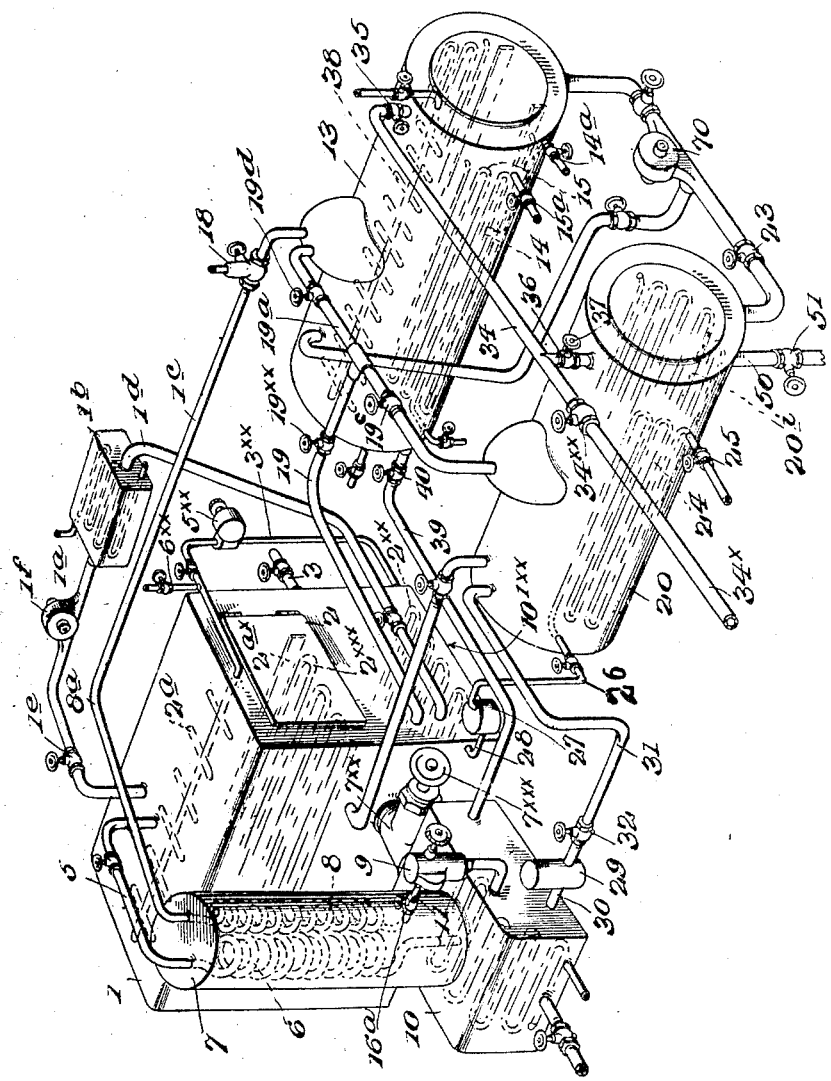
Frederick K. Fish Jr.
INVENTOR.
BY
ATTORNEY.

Patented Feb. 23, 1926.

1,574,026

UNITED STATES PATENT OFFICE.

FREDERICK K. FISH, JR., OF WINDSOR MILLS, CANADA, ASSIGNOR TO WOOD PRODUCTS & BY PRODUCTS CORPORATION, A CORPORATION OF NEVADA.

PROCESS FOR MAKING PAPER PULP.

Application filed November 5, 1920, Serial No. 421,970. Renewed May 22, 1925.

*To all whom it may concern:*

Be it known that FREDERICK K. FISH, Jr., a citizen of the United States, residing at Windsor Mills, Canada, has invented certain new and useful Improvements in Processes for Making Paper Pulp, of which the following is a specification.

This invention relates to improvements in a process for manufacturing paper pulp from plant substances.

In my co-pending application for patent Serial Number 275873, filed Feb. 8, 1919, covering a process for a similar invention I soften the material being treated, then remove the soluble constituents and melt the insoluble resins and thereafter subject the material to a digesting action. In these steps the softening of the substance is accomplished by moisture and heat while the soluble constituents were subsequently removed by the action of superheated water. In my former application the volatile and like vapors were wasted, and the treatment unduly prolonged.

I have discovered that the treatment of the plant substance from which the pulp is to be formed, can be augmented to a very considerable degree, and the result obtained more rapidly by initially charging the vapors and the water in which the material is subsequently treated with extractive substances of wood, and while being treated enriching the mixture with like extractive substances taken from the material being acted upon.

Therefore one of the essential features of my present invention resides in initially charging the vapor and water employed in the treatment, and collecting the resultant liberated extractives from the material under treatment and converting same into a mixture with the extractives initially employed to act on the contained constituents of the plant substance under treatment.

My experiments have demonstrated that when the plant substance is subjected to an atmosphere of heated vapor charged with extractives of the material under treatment the soluble constituents in the material are dissolved and thereafter more readily removed, while insoluble constituents may also be more quickly dissolved, and thereafter removed by the water charged with these extractives.

Furthermore, I find that the vapor and water charged with these extractives will render the insoluble constituents remaining in the material under treatment more susceptible to removal by the digesting chemical solution subsequently employed.

In carrying out my invention I aim to utilize upon the material under treatment all the liberated gases and charged vapors from the material under treatment, to superheat these gases and charged vapors after their initial use and after such use condense and trap them, using the condensate to strengthen the water which has also been charged with similar extractives, which is subsequently employed in the proccess thus lending economy and saving time in the manufacture of the pulp.

It is essential in the manufacture of pulp that the fibers of the plant substance be separated one from the other but preserved against mutilation or disintegration. To accomplish this it is highly important that the gums and excess resins be removed to allow the remaining resins to become broken up and to spread throughout the entire mass of the material under treatment and especially into the larger pores of the material under treatment and in consequence be easily and quickly removed by the digesting chemical solution subsequently employed. In my former application the gums are removed independently of the resins and by different liquids. The respective steps in my present application are greatly improved by the addition of the mixture of the complex extractives of the material under treatment.

In the manufacture of pulp it is well recognized that due to the presence of the gums, resins and like constituents in wood, peculiar chemical reactions take place while under treatment by the digesting chemical solution and also after the pulp has been manufactured into paper and certain acids and insoluble substances are formed thus producing an inferior pulp, and unless these deleterious substances are removed from the wood prior to treatment by the digesting chemical solution a much longer treatment is required and at a higher temperature and pressure which tends to weaken and sometimes dissolve the cellulose itself. These objectionable features are overcome by the process herein disclosed. In other words in the present application, the plant substance is treated to the action of superheated volatile vapor extractive substances from wood, etc., in the form of vapor and in the form of liquid for the conversion of the contained complex resinous substances and gums, into a more soluble form with the object of removing from the material under treatment not only soluble but insoluble materials, prior to the application of the digesting chemical solution.

To illustrate one way of carrying out the invention I have diagrammatically illustrated an apparatus in the accompanying drawing, in which, 1 indicates a chamber, or sweat box provided with a door or doors 2, $2^{ax}$ an interior track or similar supporting means, and spray pipe $2^a$. This chamber may be supplied with steam, or heated air through a pipe 3, leading from a suitable source, or heat and vapor may be introduced to the chamber through a pipe 19, leading from a digester hereinafter referred to, and if desired heat may be introduced to the chamber by means of coils $2^{xxx}$.

Communicating with the top of the chamber 1, is a pipe $1^a$ which leads into an air tight hot box $1^b$, suitably heated by coils. Communicating with the opposite end of the hot box is a pipe $1^d$, which leads into the chamber, a valve or valves $1^e$ being provided to control the pipes. In the pipe $1^a$ is a fan $1^f$, to draw the vapors from the top of the chamber, and pass them through the hot box and through the pipe $1^d$, and into the chamber preferably below the track. The fan creates a suction through the sweat box, and quickly draws off the vapors, and the latter are reheated in the hot box to a degree preferably above the boiling point of the admixture, but the temperature should not be such as to polymerize the terpenes or destroy the plant substances. The vapors thus reheated are employed to act on the plant substance to assist in melting, dissolving and removing a portion of the water soluble and water insoluble constituents from the plant substances. This allows of a more ready and effective removal of not only soluble but also water-insoluble constituents by the charged water subsequently employed. The vapors are of course charged with the terpenes, and terpene alcohols etc., which, when superheated, act to further the extraction of like constituents and a portion of the resinous substances in the plant substances.

The chamber extends below the surface of the ground to form a tank 10—$1^{xx}$ containing liquid initially charged with terpenes, and other volatile components of wood, which may have been extracted from wood, sawdust or other waste material, and in the bottom of the tank are coils $2^{xx}$ to heat the liquid. Communicating with the tank below the water level is a pipe $3^{xx}$, extending into the top of the chamber, and connected to the sprays $2^a$ to spray the liquid onto the plant substances. In the pipe $3^{xx}$ is a pump $5^{xx}$ to force the liquid from the tank 10—$1^{xx}$ to the spray pipe $2^a$. If desired a branch pipe $6^{xx}$ may join the pipe $3^{xx}$, and by means of suitable valves, cold water may be sprayed on the plant substance at intervals.

From the top or dome of the chamber extends a pipe 5, connected with coil 6 of a condenser 7, the coil extending into a collector tank 10.

A vacuum pump 9, connects at its suction end through pipe 11 to a second coil 8 of condenser 7, discharging into collector tank 10. Coil 8 is connected at its upper end to a pipe $8^a$ which leads to a digester 13. The condenser 7 is arranged to be supplied with any suitable cooling agent, as water or brine, which is circulated from a bottom inlet to an upper outlet, in the usual construction.

The collector tank 10 and the liquid tank 10—$1^{xx}$ are practically one, and communicate with each other, as by means of a pipe $7^{xx}$, having a valve $7^{xxx}$.

Located adjacent to the chamber 1, is a digester 13, arranged to receive the truck or the like, carrying the plant substance, and in the digester there is a track preferably in line with the track $2^{ax}$, in the chamber 1, and between the container and the chamber 1, there will be a track for conveniently transferring a car carrying a load of plant substance from the chamber 1. This digester is provided with a perforated coil 14, provided with a valve $14^a$, to supply steam to the interior of the digester, and also steam heating coils 15, having valve $15^a$. The pipe $8^a$ connects with the top of the digester, and in it is a safety-valve 18, which also may act as an ordinary controlling valve. The pipe 19, leading from the sweat chamber 1, is connected to a pipe $19^a$, the ends of which are connected to the top of a tank 20, and the digester 13, the pipe $19^a$ having two controlling valves $19^c$ and $19^d$ for a purpose to be explained.

In the tank 20, are heating coils 24, having a valve 25, and condensation pipe 26, connected with a steam trap 27, which preferably discharges through pipe 28, into tank 10—$1^{xx}$, and in this tank there may be perforated steam pipes $20^1$.

The suction end of a force-pump 29, is connected with the collection tank 10, by pipe 30, and the discharge end of said pump is connected to the tank 20, by a pipe 31, having a valve 32.

A pipe 34, is provided with a valve 35, and communicates with the digester 13, and with tank 20, by a branch pipe 36, provided with a valve 37. Spray pipes 38, connected with a supply of cold water are installed at the top of digester 13, and a pipe 39 provided with a valve 40, connects the digester 13, with the collector-tank 10. A branch pipe 34ˣ, connects with the pipe 34, and by means of valves 34ˣˣ live steam may be introduced into the top of tank 20, or the top of the digester 13.

The foregoing description of the conventionally illustrated apparatus is simply for the purpose of outlining a plant for carrying out my process for the manufacture of pulp, and I will now describe in detail the various steps and the functions accomplished thereby.

Liquid initially charged with terpenes, oils, and other like extractives of wood substance is introduced into tank 20, through pipe 50 by opening valve 51, and if the plant has been previously used, the contents of tank 10—1ˣˣ, are pumped into tank 20, and through the medium of heating coils 24 and 20ⁱ, the liquid is superheated, or in the other words the temperature of the liquid is raised above its boiling point, and the pressure is allowed to rise above atmospheric to prepare said liquid for quickly acting on the plant substance later on when introduced into digester 13.

A truck containing a load of plant substance is run into the chamber 1, and a suitable medium, such as steam, heated air or any combination of them are introduced through the pipe 3, this heat is above the boiling point of the liquid in tank 10—1ˣˣ so that it volatilizes and the vapors from said liquid fill the chamber 1. After the first truck load has passed through the chamber, and is under treatment in the digester 13, the vapor from the digester 13, may be utilized also, this vapor being heavily charged with the terpenes removed from the plant substance while being treated in the digester. Valves in the pipes 19 and 19ª are regulated to allow the passage of steam as desired from either or both the digester 13 and tank 20, into the chamber 1 and if necessary the heat in the said chamber may be augmented by heat from the steam coils 7ˣ.

It is desirable that the temperature in the chamber 1 be raised above the boiling point of the admixed terpenes and water, and that the treatment of the plant substance during this step of the process be for one or two hours, depending upon the character of the plant substance or material being treated. The vapors are circulated by the fan 1ᶠ through the hot box 1ᵇ where they are reheated to assist in raising the temperature in chamber 1 to a desired degree, but not high enough to polymerize the terpenes in the wood or to have a harmful effect upon the plant substance.

The steam, hot liquid produced by the spray, and terpenes or the like vapors in the chamber 1, when reheated and applied to the plant substance penetrate and soften its entire structure as well as the soluble gums and resins of the chips, the combination of steam, oils and other volatile substances at this temperature, dissolving in the cells of the wood chips, even to the interior of the separate pieces, certain substances which are normally insoluble in water only, thus preparing the chips for a more ready and effective treatment in the digester 13. The high heat reached in the chamber 1 causes the constituents which have been softened but not as yet volatized, to move to a certain extent, to the surface of the chips. This surfacewise movement may be increased by the occasional application to the surface of the chips of cold water thru spray pipe 2ª, the sudden cooling of the surface of the chips causing a partial condensation of the vapors which results in a movement surfacewise of the interior vapors and oils contained therein, as well as of other constituents.

Liquid from the tank 10—1ˣˣ, is pumped periodically to the spray pipes, to raise the temperature of the plant substance and assist in extracting the softened constituents of the plant substance from the surface.

The chamber 1, being tightly closed, some slight pressure will be created therein and to limit this pressure to the desired amount, excess vapors pass thru pipe 5, and are condensed in the coil 6, and thereupon pass into tank 10—1ˣˣ and the condensate may thereafter be pumped into the tank 20, to be used with the liquid in subsequent treatment of the plant substance, or sprayed onto the substance thru spray pipes 2ª.

The condensate accumulated in the tank 10—1ˣˣ will be pumped from time to time into tank 20 to add to the strength of the solvent liquid therein, and when the liquid in the tank 20 becomes by reuse, stronger than is necessary, it is either diluted, or it is drawn off and separated. If desired the tank 10—1ˣˣ may be of such size as will contain liquid sufficient to recharge tank 20, after all of the concentrated liquid has been drawn off.

The vapors rising from the wood in the chamber 1 are reheated and in their reheated state are directed upon the plant substance causing a dissolving and partial distillation of the resins in the chips under treatment, care being taken to regulate the temperature so that there will be no polymerization of the terpenes. Therefore, the valve 1ᵉ is opened and the fan 1ᶠ sucks the liberated vapors from the top of the chamber and introduces same into the sealed hot box, where they become reheated, and are subsequently directed thru the pipe 1ᵈ, and into the chamber 1. The result of this action is to create a circulation thru the chamber, which causes the vapors charged with terpenes, oils, and other volatile substances introduced thru pipe 1$^d$ to cooperate with the steam and the vapors liberated from the chips, to co-mingle or mix and act promptly to dissolve and liberate other similar constituents in the chips. In other words the charged vapor is by this action employed as a solvent to act on the otherwise insoluble or slightly soluble constituents in the chips. While this action is going on a portion of the excess vapors are escaping thru the pipe 5, and are condensed in tank 10 for reuse in the process.

While bringing up the temperature of the chips by the introduced heat and vapors, the hot spray pumped from the tank 10—1$^x$ is introduced upon the chips, and afterwards comes into contact with the heating coils, a portion of the spray being vaporized and it then rises and reacts together with the vapor otherwise liberated from the chips and that introduced to the chamber, to dissolve and remove a portion of the water soluble and water insoluble constituents of the chips.

As this step is continued terpenes, oils, and other like substances are liberated from the chips in the form of vapor and together with the condensate produced from the introduced vapors, as well as from a portion of the liquid spray, dilute, and partially remove water insoluble constituents of the chips which are collected in the tank below for reuse in the process.

After the chips have been treated in the chamber 1, for a sufficient time to raise the temperature to the required degree, and to soften the chips and to dissolve and remove a portion of the different constituents, the supply through pipes 3 and 1$^d$ is cut off, or if the vapors from the container 13 are utilized, valve 19$^c$ and 19$^d$ or both, are closed, and the load of chips is transferred to the container 13, and a new load is run into the chamber 1.

When the load of chips is removed from the chamber, and is exposed to the air, while in transit to the container, the differences between the internal temperature of the chips and that of the exterior, causes vaporization of the moisture within the chips and an interior movement surfacewise, this action preparing the chips for quicker treatment in the next step in the digester 13.

The chips having been introduced into the digester, the latter is sealed, and valves 16$^a$ and 18 are opened, and the vacuum pump 9 is started to create a vacuum of approximately 15 inches in the digester. To attain the vacuum quickly cold water is forced through spray pipe 38 and upon the chips. The vacuum further removes terpenes and vapors from the chips and these in passing through coil 8, condense and are discharged into the collector tank 10, for reuse in the process. The vacuum in the digester lowers the pressure within the chips below atmospheric, causing a cellular expansion, which with the removal of the vapors from the chips tends to allow a more ready penetration of the liquid employed in the next step in the process. This vacuum also removes air from the digester preventing discoloration of the resins. The vacuum is broken by the vapors passing from the chips.

The condensate from tank 10, is pumped into the tank 20, and mixes with the liquid therein, and the condensed terpenes and vapors become mixed with the superheated liquid and add to its solvent power. The valve 23, is opened and the superheated liquid passes from the tank 20, to the digester 13. The liquid in the tank 20 is initially charged with terpenes, oils and other like extractives from wood to act on the constituents of the chips in the treatment of the latter. The movement of the liquid from the tank 20 to the digester is assisted by introducing steam or other gaseous medium through pipe 24, upon the top of the body of liquid in tank 20.

As the superheated liquid, containing terpenes, oils and like extractives from wood, is introduced into the digester, to prevent excess pressure within the digester, and allow the liquid to flow freely into said digester, valve 19$^d$ may be opened and the vapor passed through pipe 19 into the chamber 1 the charged vapors being employed to assist in the first treatment of chips. The liquid may also be moved into the digester by means of the pump 70. After the liquid is turned into the digester and the chips become submerged, valve 19$^d$ is closed, and steam is turned into the heating coils 15, to maintain the liquid at a temperature above its normal boiling point, which creates a pressure in the digester or, in other words, the liquid is maintained in a superheated condition. Steam may also be admitted through perforated pipe 14.

It is desirable to heat the liquid to a temperature of or about 245° F. and a corresponding pressure of about twelve pounds above atmospheric is preferably maintained.

The chips are subjected to the liquid treatment for a period of approximately one or two hours, depending entirely upon the nature and thickness of the chips. The superheated liquid, being at high temperature and pressure, and being charged with terpenes, oils and like extractives from wood, and quickly dissolves and extracts liquid soluble gums and similar soluble constituents, and also quickly extracts oils, and terpenes, and like extractives from wood and introduces them to the liquid surrounding the chips and further melts and spreads and partially removes the true resins which are insoluble in water. As these terpenes, oils, etc., are extracted, they add to the solvent power of the liquid, and extract materials from the chips, which would be insoluble in water only.

The time of treatment under this step of the process, depends upon the character and thickness of the chips being treated, and for that reason the treatment may be shortened, or it may be prolonged and intensified for such time and to such a degree as may be found desirable. It is important however, that while this step is going on that the temperature be limited to a degree which will not polymerize the terpenes.

The superheated liquid permeates throughout the entire structure of the chips, and the materials acted upon by it are dislodged from their original position in the chips, and those which are soluble in the liquid are dissolved and, due to the surrounding pressure and the agitation and ebullition of the liquid surrounding the chips, the materials which have been removed become intermingled or mixed in the entire body of the liquid. To maintain a uniform composition of the liquid an active circulation and agitation of the liquid is secured by the pump 70 drawing from the bottom of digester 13, and discharging into the upper opposite end thereof. The liquid thus becomes further charged with solvent extractives, the nature of which is largely dependent upon the character of the plant substance or chips being treated. It has been found, however, that in practicing the process, the liquid used in the treatment contains terpenes, resins, oil and ligneous matter and the like. Furthermore, as long as the high heat is maintained, and the fact that the liquid is confined and agitated, the substances are so thoroughly intermixed in the liquid, as to make it impossible to independently distinguish them.

While the treatment is in process, the liberated extractives also become intermingled in the liquid, and this liquid, charged and mixed with these substances penetrates the chips and dissolves a portion of certain resinous substances, which are not of themselves soluble in superheated water. The hemi-celluloses such as xylan, mannan, etc., which are ordinarily insoluble in water pass into colloidal solution, a portion being hydrolyzed. A portion of the lignin passes into solution in this step of the process.

When the chips under treatment have been thus effectively acted upon by the superheated liquid, mixed with contained extractives from wood, the valves 18 and 19$^d$ and 19$^{xx}$ are opened, and the vacuum pump is started to quickly bring the pressure in digester 13 to or about atmospheric. At this time the spray of water through the spray pipes 38, upon the surface of the liquid acts to quickly condense a portion of the vapors, and to reduce the pressure above the water. The pipes 19 and 19$^a$ are opened and assist in reducing the pressure within the digester. A portion of the vapor in the digester 13, passes through said pipes 19 and 19$^a$ to the tank 20, and to the chamber 1. This sudden release of pressure surrounding the chips causes liquid in the chips to flash into vapor, thereby forcing both soluble and insoluble materials in the interior of the chips towards its surface and into the liquid and also causes an expansion of the chips and the individual fibers thereof. This is a very important step in the process. When the pressure within the container reaches atmospheric or lowered to any desired degree, the temperature and pressure of the liquid surrounding the plant substance may again be raised. These sudden changes in pressure and temperature may be resorted to as many times as may be deemed advisable.

After the plant substance has been treated in superheated liquid as above, one or more times, additional liquid from tank 20, is forced over to fill the digester 13, by the pump 70, and by continued operation of the pump, pressure of about 15 lbs. is again created in said digester while the chips are still submerged, but the liquid at this time is not superheated. This pressure is suddenly released by passing some of the liquid back to tank 20, this action effects a sudden lowering of the pressure surounding the chips and causes an outflow of the liquid from the interior of the chip.

The valve 23, is again opened and the pump 70 forces the liquid from the digester to tank 20 for reuse.

Following this step, valve 18 is opened, and the vacuum pump 9 is started, and a vacuum is again created in the digester 13 to remove from the chips liquid which has been forced into it, and simultaneously cold water is sprayed onto the chips through the spray pipe 38, to condense quickly the vapors and assist in creating a vacuum quickly.

The liquid treatment may be repeated and alternated with a vacuum, to insure of the extraction of the elements from the chips, as it has been found that the plant structure when first opened up by the action of the liquid and then acted on by a vacuum, will further give off some of its constituent elements.

The vacuum is broken and the liquid is conveyed to the tank 20, and a suitable digesting chemical solution is introduced into the digester, and the plant substance is again submerged. The digesting solution now acts on the remaining melted resins and lignin and quickly removes same.

The treatment of the plant substance up to this time was for the purpose of removing soluble and insoluble constituents including a portion of the lignin from the material under treatment prior to the treatment by the digesting chemical solution. That is to say up to the time of the chemical digesting step water soluble constituents and insoluble constituents of the material under treatment had been removed and constituents which it may be desired to remove had been melted and spread throughout the structure of the substance so as to make such constituents more susceptible to the action of the acid or like digestive solution subsequently employed. It is true that in the complex make up of the plant substance certain of the insoluble constituents are ordinarily not subject to removal by heat and boiling water. However I have found that by the employment of the superheated water, charged with wood extractives and the incident pressure upon material which has been previously acted upon by such charged vapors much of the insoluble constituents is rendered subject to attack and a very considerable portion thereof removed. This lends great weight to the value of the process when the chemical digesting period is reached. Hence it is necessary to employ the chemical digesting solution but for a short space of time to complete the digesting action. The chemical digesting solution may be reused as the previous digestion by the charged water has caused a removal of soluble and insoluble constituents from the wood which under other process neutralizes the chemical solution.

As the effects of the chemical digesting solution are well known it is not necessary to describe its action in detail sufficient to say there is a quick and effective removal of the remaining resins, lignin and like constituents of the wood in consequence of the previous removal of soluble and insoluble constituents by previous steps of my process and under a much lower pressure and temperature, the fibers are separated and the woody structure is in no wise marred or destroyed, which results in a pulp free of substances and elements which in other processes affect the paper subsequently produced.

After the digesting chemical action is completed the digesting chemical solution is drawn off, the digester is filled with water preferably heated and pressure created in the digester to cause the water to penetrate the individual fibers and remove quickly and effectively any of the chemicals from the chemical digesting solution which may have remained in the pulp and which, if left therein, would act as an "antichlor".

In the chemical digesting step as now practiced in the manufacture of pulp, the chemicals employed become intermixed with the constituents of the wood and preclude the future use of the chemical, and as a rule such chemical is run off as waste, and in time the surrounding streams and rivers become contaminated or poluted, a condition which is dangerous to life and health. According to my invention, only a portion of the lingnin, resins and like constituents are the only elements attacked by the chemical digesting solution with the result that it may be constantly reused.

In the reuse of the charged water in which the plant substance partially digested all the oils, terpenes, gums and other extractives, and in time the water becomes so contaminated that it must be replenished. However before this stage is reached, I take advantage of the extractive mixture and employ it in future operations. These complex extractives when mixed with heated water and the attendant high temperature and incident pressure will effectively dissolve and remove like substances, and it is for this purpose that I reuse it in the present process. It enables me to complete the digestion in a remarkably short space of time, it is economical and it is effective.

The term "vacuum" as herein used is intended to mean a reduction of pressure to such a degree below the higher pressure employed as to cause a substantial expansion of residual air or vapor in the interior of the wood which effects an opening up of the interior fibrous structure.

The above description defines a process involving several independent steps, each of which tends in its sequence and relation to the other steps to produce a probably better result in the final product, than if such particular step were omitted. However, it is to be understood that certain of said steps may be replaced by others of a similar or even previously known type without affecting the result, except in matter of degree, with the exception however, that the important and essential step of the process is required in every instance to produce the result sought. This essential and important step of the process consists in submerging the plant substance in superheated liquid charged with volatile solvent extractives of the substance to thereby melt, dissolve, and remove, desirable portions of the soluble and water-insoluble constituents of the substance and then removing the liquid with its contained extractives from about the plant substance, and thereafter digesting the plant substance in a separate chemical solution. This important step is also subject to specific modification in its utilization to extract the soluble and water-insoluble constituents from the plant substance, for example, in alternately increasing and decreasing the pressure and temperature of the liquid in which the plant substance is submerged, to cause such variation in pressure to alternately force the liquid charged with the volatile extractives into the plant substance and withdraw it therefrom with the contained extractives, and the further use of this charged liquid for the further treatment of the same or seubsequent mass of plant substance. This liquid charged with the volatile extractives of the plant substance is maintained in such charged condition for reuse, to thereby take advantage of the solvent effect of these volatile extractives in the treatment of fresh material.

Therefore, it is to be understood that while the steps of initially treating the plant substance to a heated moist fluid which contains volatile extractives of the substance being treated; utilizing this liquid after its initial effect on the substance as a circulating medium through and around the plant substance, tend to a more effective and quicker action of the process as a whole when used prior to the essential step of the process, such steps are not absolutely essential to the process herein described and need not necessarily be used to secure a desirable result from the use of the essential step above described. Therefore, such additional steps will be hereinafter claimed merely as steps in a process for the making of paper pulp from plant substance, as they have their independent advantage in rendering the result of the essential step quicker in point of time and more perfect in quality of product.

What I claim is:—

1. The process of making paper pulp from plant substances, consisting in subjecting the plant substance to a heated medium containing added volatile extractives from the plant substance, then submerging the plant substance in superheated liquid charged with volatile extractives of the plant substance, then removing the liquid from around the plant substance, and thereafter further digesting the plant substance in a separate chemical solution.

2. The process of making paper pulp from plant substances, consisting in subjecting the plant substance to a heated moist medium charged with volatile extractives from the substance, then submerging the plant substance in superheated liquid charged with volatile solvent extractives of the substance, then removing the charged liquid from around the plant substance, and thereafter digesting the plant substance in a separate chemical solution.

3. The process of making paper pulp from plant substances, consisting in subjecting the plant substance to a circulating moist medium charged with volatile extractives from the substance, then submerging the plant substance in superheated liquid under pressure charged with volatile solvent extractives of the substance, then withdrawing the liquid from around the plant substance, and thereafter further digesting the plant substance in a separate chemical solution.

4. The process of making paper pulp from plant substance, consisting in subjecting the plant substance while in a sealed chamber to the action of a heated medium charged with volatile extractives of the plant substance, then submerging the plant substance in superheated liquid charged with volatile extractives of the substance, then withdrawing the liquid from around the plant substance, and thereafter further digesting the plant substance in a separate chemical solution.

5. The process of making pulp from plant substance, consisting in treating the substance with superheated water initially charged with volatile extractives from wood and thereafter in use, also charged with volatile extractives of the plant substance of the character being treated, to thereby dissolve, melt, and decompose constituents of the substance, said liquid being at a temperature above the boiling point of water and at a pressure greater than atmosphere, withdrawing the liquid from around the substance, and thereafter further digesting the plant substance in a separate chemical solution.

6. Those steps in the process of making paper pulp from plant substance, consisting in submerging the plant substance in heated liquid initially charged with volatile solvent extractives of the substance, subjecting the mass to alternate increases and reductions in pressure, withdrawing the charged liquid from the plant substance and thereafter digesting the plant substance in a separate chemical solution.

7. Those steps in the process of making paper pulp from plant substance, consisting in subjecting the plant substance to a heated liquid under pressure and initially charged with volatile solvent extractives of the substance, suddenly reducing the pressure during treatment to permit extractives within the cells of the plant substance to move toward and into the liquid, then removing the liquid from around the plant substance, and thereafter digesting the plant substance in a separate chemical solution.

8. The process of making paper pulp from plant substance, comprising subjecting the plant substance to heated moist atmosphere charged with the volatile solvent extractives from the plant substance being treated, collecting the charged vapors and condensing same to be subsequently vaporized to act on the plant substance, transferring the plant substance to a digester and submerging the plant substance in superheated liquid initially charged with volatile solvent extractives from plant substances to melt, dissolve, and remove, a portion of the soluble and insoluble constituents, relieving the pressure from the digester and collecting the vapor from the liquid and collecting same for enriching the liquid in which plant substance is to be treated to form pulp, removing the liquid, and thereafter further digesting the plant substance in a chemical digesting solution.

9. The process of making paper pulp from plant substance, comprising subjecting the plant substance to superheated vapor charged with the volatile solvent extractives of plant substance together with a supply of heated air, thereafter submerging the plant substance in superheated liquid charged with the volatile solvent extractives of plant substance to cause a portion of the soluble and insoluble constituents to move s facewise, removing the liquid, and thereafter further digesting the plant substance in a chemical digesting solution.

10. That step in the process of making paper pulp from plant substance, which consists in subjecting the plant substance to a medium initially charged with volatile solvent extractives of the plant substance to thereby melt, dissolve, and remove, a portion of the soluble and water-insoluble constituents of the plant substance, and circulating this medium through and around the plant substance in its continually and increasingly enriched condition resultant from the extractives removed from the substance.

11. The process of making paper pulp from plant substance, consisting in treating the plant substance in a medium charged with extractives of the subtsance to dissolve and remove the water soluble constituents and at the same time melt certain of the constituents which are not soluble in water, then treating the plant substance in superheated water containing extractives of the substance to further melt and spread the resins and like constituents of the plant substance, and then treating the plant substance in a separate digesting chemical solution to remove the resins and like constituents to form pulp.

12. Those steps in the process of making paper pulp from plant substance, consisting in submerging the plant substance in superheated liquid charged with volatile solvent extractives of the substance, withdrawing the charged liquid from around the plant substance, subjecting the substance to a vacuum to remove material from the substance, and thereafter digesting the plant substance in a separate chemical solution.

13. Those steps in the process of making paper pulp from plant substance, consisting in subjecting the substance to a vacuum, then submerging the plant substance in superheated liquid charged with volatile solvent extractives of the substance, withdrawing the charged liquid from around the plant substance, and thereafter digesting the plant substance in a separate chemical solution.

14. Those steps in the process of making paper pulp from plant substance, consisting in submerging the plant substance in superheated liquid charged with volatile solvent extractives of the substance, circulating the liquid during treatment to maintain a uniform composition of such liquid, withdrawing the charged liquid from around the plant substance, and thereafter digesting the plant substance in a separate chemical solution.

15. The process of making pulp from plant substance, consisting in treating the substance with superheated water initially charged with volatile extractives from wood and thereafter in use, also charged with volatile extractives of the plant substance of the character being treated, to thereby dissolve, melt, and decompose constituents of the substance, said liquid being at a temperature above the boiling point of water and at a pressure greater than atmosphere, suddenly reducing the pressure and temperature of the liquid to further remove by force said melted, dissolved and decomposed constituents from the substance being treated, withdrawing the liquid from around the substance, and thereafter further digesting the plant substance in a separate chemical solution.

In testimony whereof I affix my signature.

FREDERICK K. FISH, Jr.